March 11, 1969        E. SENGER        3,432,006
HYDRAULIC HOIST FOR MOTOR VEHICLES
Filed March 3, 1967
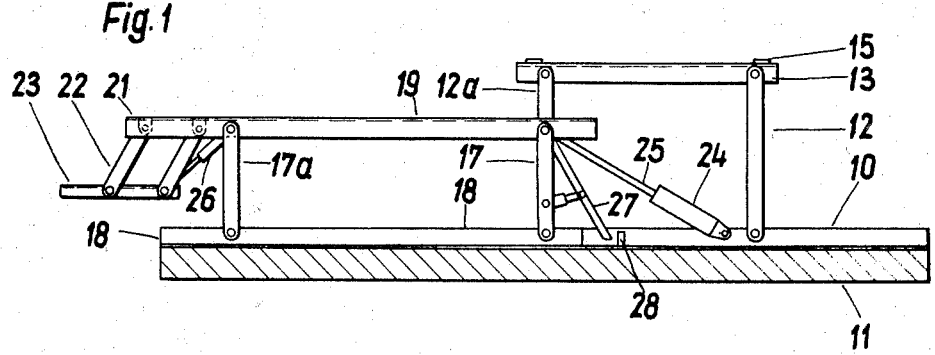
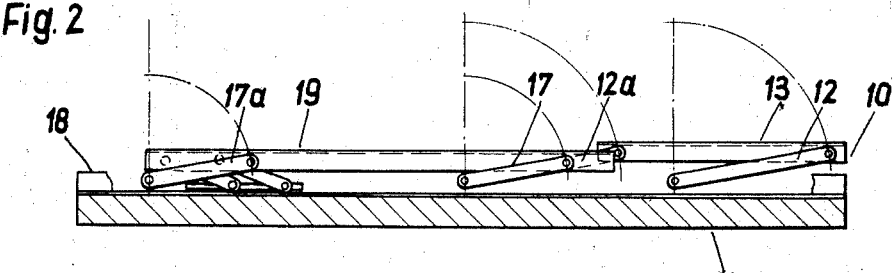
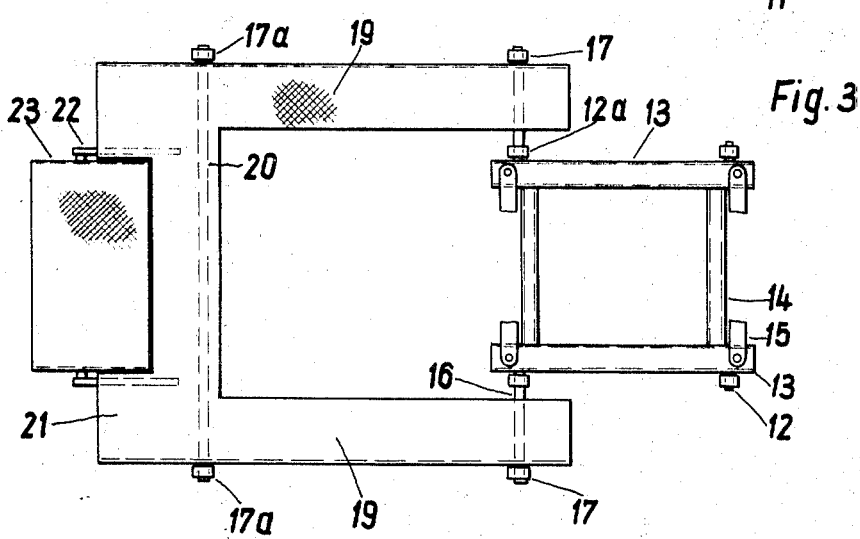
Inventor:
EGON SENGER
By Lowry & Rinehart
ATTYS.

United States Patent Office 3,432,006
Patented Mar. 11, 1969

3,432,006
HYDRAULIC HOIST FOR MOTOR VEHICLES
Egon Senger, 51 Hansastrasse, Rheine,
Westphalia, Germany
Filed Mar. 3, 1967, Ser. No. 620,498
Claims priority, application Germany, Apr. 26, 1966,
S 103,429
U.S. Cl. 187—8.72                                7 Claims
Int. Cl. B66f 7/08

ABSTRACT OF THE DISCLOSURE

A lifting device for working simultaneously at different levels on a motor vehicle. This device includes a vehicle supporting means, a lifting means connected to the supporting means to raise the vehicle to a level for working underneath. The device further includes a platform means which is operably connected to the supporting means for working simultaneously at a level above the floor at another point on the vehicle. The connecting means functions to raise the platform means to a working position when the supporting means is raised to a working position.

Background of the invention

This invention further relates to hydraulic hoists for motor vehicles, and more specifically to a hydraulic motor vehicle hoist enabling a motor vehicle to be worked on simultaneously on three different levels.

There are already known a plurality of prior art vehicle hoists for lifting motor vehicles to the respectively required working level. However, neither of these prior art vehicle hoists enables all repairs to be effected at the same time but only one after the other in dependence on the actual position of the motor vehicle.

It is an object of the present invention to provide a hydraulic hoist for motor vehicles which has many advantages over the prior art vehicle hoists and enables work on a motor vehicle to be effected on three different levels at the same time, without changing the actual position of the motor vehicle, by mechanics standing erect.

Another object of the invention is to provide a hydraulic motor vehicle hoist which is of very simple design and thus cheap in manufacture.

A further object of the invention is to provide a hydraulic motor vehicle hoist which is dimensioned so that it can easily be installed everywhere and also readily be remounted.

A still further object of the invention, finally, is to provide a hydraulic motor vehicle hoist which can be used in a space-saving manner.

To attain these objects the present invention provides a hydraulic hoist for motor vehicles with lifting means including pairs of raisable and lowerable arms which, on the one hand, are hinged to supporting section irons fixed to the floor along the edges of a repair pit and, on the other hand, are hinged to longitudinal girders, which is characterized in that three vertically staggered working surfaces are provided, that is, a lowermost working surface not more than 90 cm. below the shop floor, an intermediate working surface on a level with the shop floor, and an upper working surface in the form of a working platform which is 60 cm. above the floor and pivoted to the pairs of hinged arms of the lifting means.

In a preferred embodiment of the invention the working platform is of U shape and formed of two longitudinal or leg portions and a transverse or web portion.

The longitudinal portions of the working platform may be secured to the upper ends of first and second pairs of levers the lower ends of which are pivoted to supporting section irons fixed to the floor.

In a special embodiment of the invention a foot board is linked with the transverse or web portion of the working platform through the intermediary of pivoted levers, which foot plate is adapted to be hydraulically retracted and extended.

Since the mechanics are enabled to work on three different levels, i.e., in the pit, on floor level, and on the working platform, they can stand erect while working. The repair pit now needs only to have a depth of 90 cm. so that the ventilation required for deeper pits according to safety regulations is eliminated, whereby the operating cost of the vehicle hoist is reduced. Moreover, the vehicle hoist proposed by the invention can be adapted to any other repair pit by a few manipulations. Old pit installations can thus be modernized.

When a vehicle is being lifted to the intermediate level, all four wheels of the vehicle come free at the same time. When the vehicle hoist is extended or raised, a foot board for the lowermost level used for working on the engine is hydraulically extended at the same time. Altogether, the vehicle hoist affords a good survey of the working place and, furthermore, it is of slight structural height.

Finally it is to be noted that the hydraulic motor vehicle hoist proposed by the invention is simple both in design and manufacture and thus of low manufacturing cost. It is space-saving and universally applicable.

Brief description of the drawing

The invention will now be described by way of example and with reference to the accompanying drawing, in which:

FIG. 1 is a side elevational view showing the hydraulic vehicle hoist according to the invention in the lifted or opened state;

FIG. 2 is a view similar to that shown in FIG. 1 but showing the vehicle hoist in the lowered or collapsed state, and FIG. 3 is a top plan view of the vehicle hoist of the invention.

Description of the specific embodiment

The drawing shows a hydraulic hoist for motor vehicles which comprises two angle irons 10 arranged on both sides of an inspection or repair pit (not shown) and extending longitudinally thereof. The legs of the angle irons 10 which contact the floor 11 of a repair shop or the like are provided with a plurality of holes through which extend the threaded shanks of stone bolts anchored in the floor 11, said shanks being threadably engaged by nuts.

Hinged to the vertical leg of each of the angle irons 10 are two longitudinally spaced arms 12 and 12a which at their ends remote from the angle irons 10 are hinged to longitudinal girders 13. As shown in FIG. 3, the longitudinal girders 13 may be connected by transverse girders 14, which is however not necessary. Pivotally mounted on the longitudinal girders 13 are plates 15 providing a perfect support for a vehicle on the hoist.

Each of the two opposite arms 12a is provided with a bore located below the pivot point on the longitudinal girder 13 and receiving as an axle an outwardly extending pin or rod 16 which, on the other hand, pivotally mounts a lever 17. The pivoted levers 17, the length of which amounts to about two thirds of the length of the hinged arms 12a, are hinged, on the other hand, to the vertical legs of two further angle irons 18 fixed to the floor 11 by means of anchor screws. The spacing of the angle irons 18 exceeds that of the angle irons 10 mounted on the edges of the pit by twice the length of the pin or rod 16.

Spaced apart from the first pair of pivoted levers 17 a second pair of levers 17a is pivoted to the angle irons 18. The upper ends of the pivoted levers 17 and 17a are hinged to the longitudinal portions 19 of a working platform. A rod 20 preferably extends between the upper bores in the second pair of pivoted levers 17a. The rod 20 and the relatively short rods 16 between the hinged arms 12a and the first pair of pivoted levers 17 support the longitudinal portions 19 of the working platform. The working platform is provided in the form of a U of which the longitudinal portions 19 form the legs which are connected by a web portion 21 with which a foot board 23 is linked through the intermediary of pivoted levers 22.

The above described vehicle hoist can be raised and lowered through a pressure oil system comprising hydraulic cylinders 24 provided with piston rods 25 which engage the rods 16 in the region of the hinged arms 12a. Moreover, a hydraulic cylinder 26 is provided which, by means of its piston rod, is adapted to retract the foot board 23 when the vehicle hoist is to be collapsed and to extend it when the vehicle hoist is to be raised.

For securing the vehicle hoist in the raised position against unintentionally being collapsed a locking bar 27 is provided which engages a pin 28 or a cam. Collapsing the vehicle hoist and lowering the motor vehicle is thus possible only after having lifted the locking bar 27 over the pin 28 by mechanical operation or by means of a hydraulically operable ram.

The invention may be embodied in other specific forms without departing from the spirit or essential characteristics thereof.

I claim:

1. A lifting device for working simultaneously at different levels on a motor vehicle comprising:
    (a) a vehicle supporting means;
    (b) lifting means connected to the supporting means to raise the vehicle to a level for working underneath the vehicle;
    (c) a platform means for working simultaneously at a level above the floor at another point on the vehicle;
    (d) means operably connecting the platform means at the supporting means to raise the platform means to a working position when the supporting means is raised to a working position, a ladder means mounted on the platform means to enable a workman to ascend to the platform means which is in a working position, the said supporting means including pairs of raisable and lowerable arms pivotally hinged at one end to a device-supporting structure which is fixed to a floor,
        said arms pivotally hinged at the other end to a vehicle-supporting structure,
        said platform means including longitudinal members connected to at least one pair of said arms, and
        connecting means including a hinged structure to cause said arms and members to pivot with respect to each other as the lifting means raises the supporting means to the working position.

2. A lifting device as defined in claim 1 wherein the said device-supporting structure includes sections secured to border regions of a working pit formed in the floor to locate the lifting device over the working pit thereby providing three levels for simultaneously working on a vehicle,
    said levels including a position below the shop floor, a position at the shop floor, and a position on the working platform above the shop floor.

3. A lifting device as defined in claim 1 wherein said lifting means includes a hydraulic motor.

4. A lifting device as defined in claim 1 wherein said platform means is U-shaped and includes two longitudinal members and a transverse web portion interconnecting said members.

5. A device as defined in claim 4 which includes a pair of levers hingedly connected at one end to said device-supporting structure and hingedly connected at the other end to the ends of said longitudinal members,
    a pair of arms hingedly connected at one end to said ends of the longitudinal members and hinged connected at the other end to the vehicle-supporting structure.

6. A lifting device as defined in claim 4 wherein said ladder means includes a hydraulically retractable and extendable foot plate pivotally connected to said web portions by means of pivotally connected levers.

7. A lifting device as defined in claim 4 wherein said lifting means includes a hydraulic motor.

References Cited

UNITED STATES PATENTS

| | | | |
|---|---|---|---|
| 1,727,182 | 9/1929 | Smith | 187—8.71 |
| 3,330,381 | 7/1967 | Halstead | 187—8.72 |

FOREIGN PATENTS 262,204  1/1965  Australia.

RICHARD E. AEGERTER, *Primary Examiner.*

H. C. HORNSBY, *Assistant Examiner.*